United States Patent [19]
Landfahrer et al.

[11] Patent Number: 6,062,027
[45] Date of Patent: May 16, 2000

[54] INTERNAL COMBUSTION ENGINE WITH AN EXHAUST GAS TURBOCHARGER

[75] Inventors: Klaus Landfahrer, Graz; Walter Reczek, Windisch; Wolfgang Cartellieri, Graz; Hans Aufinger, Graz; Gabor Hrauda, Graz; Wolfgang Kriegler, St. Paul im Lavanttal, all of Austria

[73] Assignee: AVL List GmbH, Graz, Austria

[21] Appl. No.: 09/083,244

[22] Filed: May 22, 1998

[30] Foreign Application Priority Data

May 28, 1997 [AT] Austria .................................. 323/97 U

[51] Int. Cl.$^7$ ............................ F02M 25/07; F02B 37/02
[52] U.S. Cl. ............................................................. 60/605.2
[58] Field of Search ............................................ 60/605.2

[56] References Cited

U.S. PATENT DOCUMENTS

| | | | |
|---|---|---|---|
| 4,179,892 | 12/1979 | Heydrich | 60/605.2 |
| 5,611,203 | 3/1997 | Henderson et al. | 60/605.2 |

FOREIGN PATENT DOCUMENTS

| | | | |
|---|---|---|---|
| 2855687A1 | 6/1979 | Germany . | |
| 4235794 | 10/1993 | Germany | 60/605.2 |
| 4319380A1 | 12/1993 | Germany . | |
| 1296737 | 3/1987 | U.S.S.R. | 60/605.2 |
| 2312930 | 11/1997 | United Kingdom | 60/605.2 |

*Primary Examiner*—Michael Koczo
*Attorney, Agent, or Firm*—Watson Cole Grindle Watson, P.L.L.C

[57] ABSTRACT

In an internal combustion engine with an exhaust gas turbocharger comprising a charge-air pipe and an exhaust gas recirculation pipe for a partial stream of the exhaust gas, a nozzle-diffuser unit is provided in the charge-air pipe, into which unit the recirculation pipe opens in a passage of restricted cross-section. In order to achieve high turbine efficiency as well as high exhaust quality, it is provided in the invention that the exhaust gas turbocharger be configured at least as a twin-entry unit, and that at least two exhaust gas flow paths be conducted separately to the entrance into the exhaust gas turbocharger, and that an exhaust gas recirculation branch depart from each exhaust gas flow path, and further that a control valve be positioned in each recirculation branch for regulation of the exhaust gas recirculation.

13 Claims, 2 Drawing Sheets

INTERNAL COMBUSTION ENGINE WITH AN EXHAUST GAS TURBOCHARGER

BACKGROUND OF THE INVENTION

This invention relates to an internal combustion engine with an exhaust gas turbocharger comprising a charge-air pipe and an exhaust gas recirculation pipe for a partial stream of the exhaust gas, a nozzle-diffuser unit being provided in the charge-air pipe, and the recirculation pipe opening into the nozzle-diffuser unit in a passage of restricted cross-section, and an exhaust gas cooling device and an exhaust control device being provided in the recirculation pipe.

DESCRIPTION OF THE PRIOR ART

In the course of increasingly strict emission regulations a strong reduction of $NO_x$ emissions from internal combustion engines is required. This is achieved in a known manner by recirculating a portion of the exhaust gas from the exhaust manifold into the intake system, whereby the temperatures in the combustion chamber are lowered and the production of $NO_x$ is strongly reduced.

In some of the specified test cycles $NO_x$ emissions must be reduced, at high loads in particular, as both in the old and new European 13-mode-cycle for truck engines (ECER 49 and ESC, respectively) several operating points of relevance for cycle emissions are on the full-load curve or in the high-load range of the engine. With supercharged engines exhaust gas recirculation will not always be possible in this range of the characteristics, since due to the turbocharger characteristic the mean pressures in the intake manifold are significantly higher for these operating points than those in the exhaust manifold.

To facilitate exhaust gas recirculation it would be possible principally to increase the pressure in the exhaust manifold by means of a back pressure flap. Because of the exhaust back pressure, the efficiency and fuel economy of the engine will deteriorate considerably, however.

One solution to this problem would be the use of a check valve in the exhaust gas recirculation pipe, which would ensure exhaust recirculation even when the mean pressure in the exhaust manifold is lower than that in the intake system. In this instance problems may arise with the check valve, however, which is subject to high thermal loads; besides, the large pressure differences between intake system and exhaust manifold may prevent satisfactory recirculation of exhaust gases.

In DE 43 19 380 A1 an internal combustion engine of the above type is described, in which the recirculation pipe opens into the nozzle-diffuser unit located in the charge-air pipe, in a passage of restricted cross-section. As a consequence, the intake air which has been compressed in the turbocharger will be accelerated in the nozzle, and the static pressure will drop sharply and fall below the pressure in the exhaust system if suitable dimensions are chosen. At a site of suitably reduced pressure the exhaust gas coming from the recirculation pipe is introduced largely without losses. In the adjacent diffuser the high flow velocities are retransformed into pressure, thus keeping the system's losses low. This will permit exhaust gas recirculation even if the pressure difference between the exhaust system and the intake system is unfavourable, in addition to avoiding thermal problems in the exhaust gas recirculation system.

In large-volume multicylinder engines, as for instance in heavy-duty commercial vehicles, a known way of improving the efficiency of the exhaust gas turbine is the use of an exhaust gas turbocharger with a small, twin- or multiple-entry turbine instead of a single-entry turbine; the exhaust flow paths of several cylinders are combined into groups which are separately conducted to the turbine.

In DE 28 55 687 A1, for example, a multicylinder internal combustion engine is described, whose exhaust passages are combined into two exhaust flow paths separately leading to a twin-entry exhaust gas turbine unit. An exhaust gas recirculation pipe branches off only from one of these flow paths, which will recirculate portions of the exhaust gas from three of the six cylinders back to the charge-air pipe. The exhaust gas of the remaining cylinders remains untreated and is passed to the exhaust tract. Because of the limits on the exhaust gas recirculation rate, this will impair emission quality.

SUMMARY OF THE INVENTION

It is an object of this invention to avoid these disadvantages in an internal combustion engine as described above and to achieve high exhaust quality by means of a high exhaust recirculation rate as well as high efficiency, in particular of the exhaust gas turbine and with respect to cylinder charging.

This is achieved in the invention by providing that the exhaust gas turbocharger be configured at least as a twin-entry unit, and that at least two exhaust gas flow paths be separately conducted to the entrance into the exhaust gas turbocharger, and that an exhaust gas recirculation branch of the exhaust gas recirculation pipe depart from each exhaust gas flow path, and that preferably as an exhaust gas control device an exhaust gas recirculation control valve be positioned in each exhaust gas recirculation branch. By providing a separate recirculation branch for each exhaust gas flow path, a high degree of recirculation may be achieved. Provisions may be made for the exhaust gas recirculation branches to unite in a collective recirculation pipe. Moreover, the exhaust gas cooling device may be positioned in the collective recirculation pipe.

It is provided in another, especially preferred embodiment of the invention that an exhaust gas cooler be provided in each exhaust gas recirculation branch, the exhaust gas recirculation branches preferably uniting downstream of the exhaust gas recirculation control valves. In this manner the amount of recirculated exhaust gas arriving from each exhaust gas flow path or each group of cylinders can be separately controlled and cooled. At the same time the flow into the exhaust gas turbine is left largely undisturbed, as the exhaust gas recirculation branches will meet only downstream of the exhaust gas recirculation control valves.

It is provided in a preferred variant that the nozzle-diffuser unit be configured as a venturi nozzle. This will permit a particularly effective exhaust gas recirculation, even when relatively high pressures are encountered in the charge-air pipe.

The effectiveness of exhaust gas recirculation may be further increased by providing a bypass line running in parallel with the nozzle-diffuser unit, including a control valve which is preferably configured as a throttle valve. As a decrease in pressure according to the Venturi principle depends not only on the geometrical shape of the nozzle and diffuser, but also on the mass flow through the system, the control valve in the bypass line will also serve to control the amount of exhaust gas recirculated. Moreover, in regions of the engine characteristics where no exhaust gas recirculation is required, flow resistances may be kept extremely low by opening the control valve.

In order to keep thermal loads of the exhaust gas recirculation control valves as low as possible these valves may be positioned downstream of the exhaust gas cooling device. If they are placed upstream of the cooling device, a more robust variant of exhaust gas recirculation control valves with better heat resistance is required.

DESCRIPTION OF THE DRAWINGS

Following is a more detailed description of the invention as illustrated by the accompanying drawings, in which.

Figure 1:
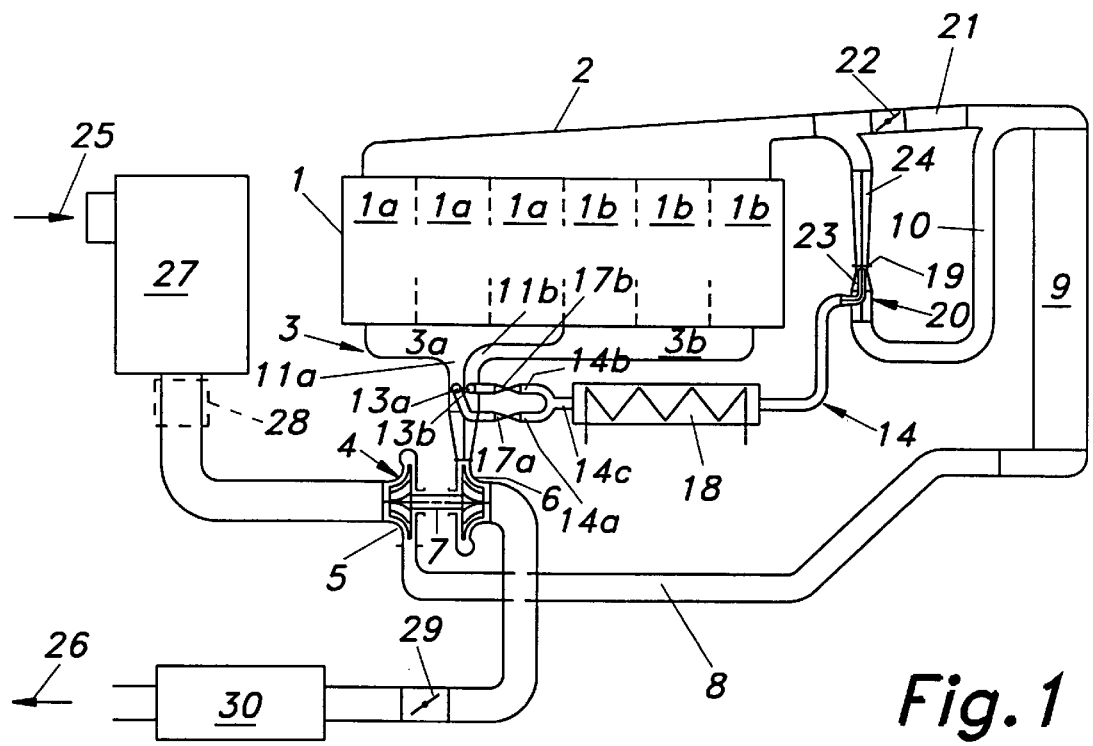
FIGS. 1 to 4 are schematical representations of possible variants of the invention.

The Figures show an internal combustion engine 1 with an intake manifold 2 and an exhaust manifold 3. An exhaust gas turbocharger 4 is provided with a compressor 5 and a twin-entry exhaust gas turbine 6, which are connected by a shaft 7. The air compressed by the compressor 5 is passed via a charge-air pipe 8 into the charge-air cooler 9, and further via a charge-air pipe 10 into the intake manifold 2. The exhaust manifold 3 has two collecting chambers 3a, 3b each receiving the exhaust gas of one of the cylinder groups (1a, 1b). The exhaust gas is passed from the collecting chambers 3a, 3b via separate flow paths 11a, 11b to the exhaust gas turbine 6. Each of the flow paths 11a, 11b contains a connection 13a, 13b with an exhaust gas recirculation branch 14a, 14b departing therefrom.

The exhaust gas recirculation branches 14a, 14b of the exhaust gas recirculation pipe 14 either unite to form a collective recirculation pipe 14c between connections 13a, 13b and the entrance into the charge-air pipe 10 (FIGS. 1 to 3), or they are conducted separately up to the nozzle-diffuser unit 20. In either instance the exhaust gas recirculation pipe 14 will open into the nozzle-diffuser unit 20 located in the charge-air pipe 10 in a passage of restricted cross-section 19. For control of the mass flow through the nozzle-diffuser unit 20, a bypass line 21 is provided parallel thereto, which branches off from the charge-air pipe 10 and opens into the intake manifold 2, and in which is positioned a control valve 22 configured as a throttle flap.

The nozzle-diffuser unit 20 is configured as a venturi tube, and comprises substantially a conical nozzle 23 and a conical diffuser 24, the dimensions and shapes of the two elements being essential for the prevention of flow detachment in the diffuser 24. The diffuser 24 may be directly adjacent to the conical nozzle 23 or connected thereto by a piece of pipe with constant diameter. The exhaust gas preferably is admitted at a point next to the narrowest cross-section in the nozzle-diffuser unit 20. For the purpose of flow stabilisation it would also be possible, however, to admit the exhaust gas at a point of sufficiently small diameter upstream of the narrowest cross-section 19 of the nozzle 23. In any case the entrance passage of the exhaust gas must be designed with due consideration to the flow mechanics, especially with regard to the prevention of flow detachment in the diffuser. Centered introduction of the exhaust gases as shown in FIGS. 1 and 2 would be preferable, although it would also be possible for the exhaust gases to enter through one or several openings distributed over the periphery of the unit.

In the variant shown in FIG. 1 the two exhaust gas recirculation branches 14a and 14b are joined immediately behind the exhaust gas recirculation control valves 17a and 17b, which are provided for regulation of the exhaust gas recirculation. Downstream of the junction of the two branches 14a, 14b is located an exhaust gas cooling device 18, which is formed by a single exhaust gas cooler and will cool down the exhaust gas to a suitable temperature before it enters the charge-air pipe 10. As only a single cooler is required, the unit is characterised by comparatively low manufacturing costs and simplicity of design. Since the point where the two branches 14a, 14b of the recirculation pipe 14 unite is very close to connections 13a, 13b, very small additional volumes will result for each flow path 11a, 11b between the connections 13a, 13b and the control valves 17a, 17b located upstream of the junction of the two branches 14a, 14b, which in turn will have a favourable effect on turbine efficiency, in particular in acceleration processes and in the lower rpm region at full load.

Figure 2:
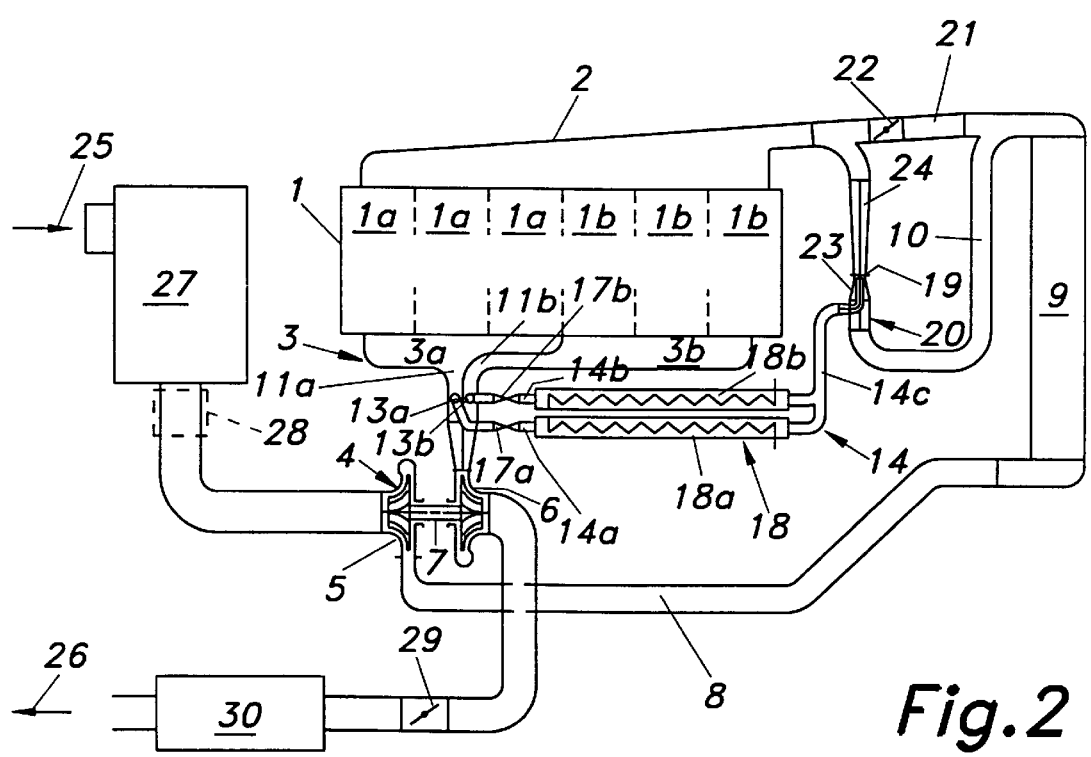
Figure 3:
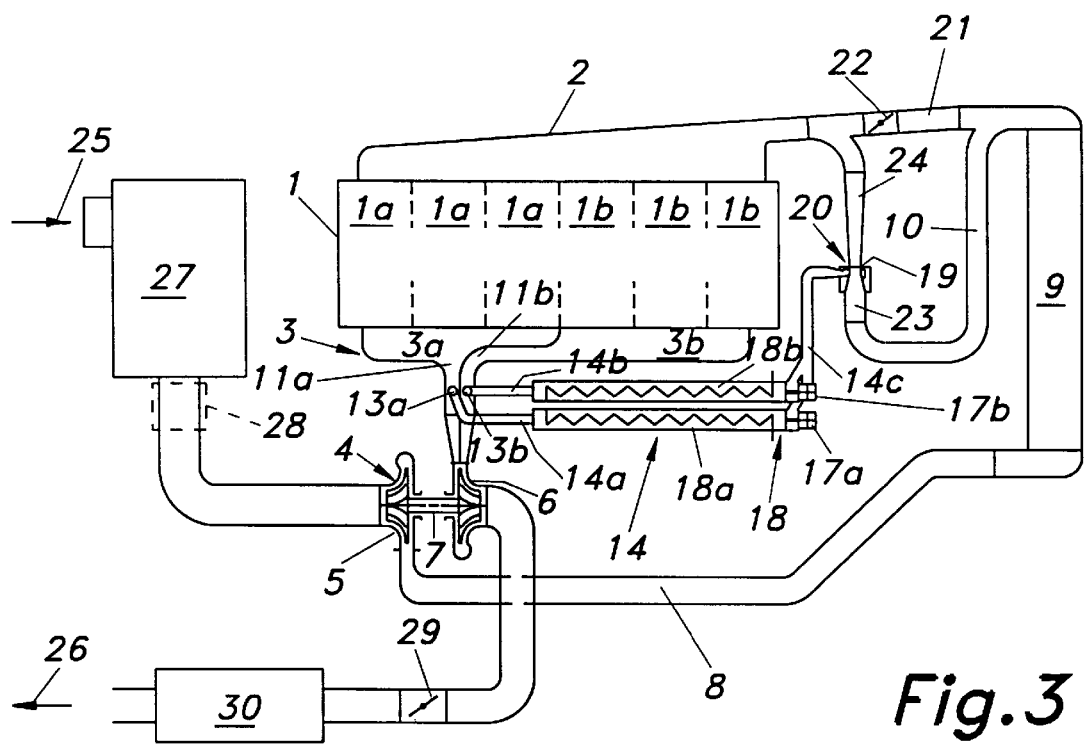
Figure 4:
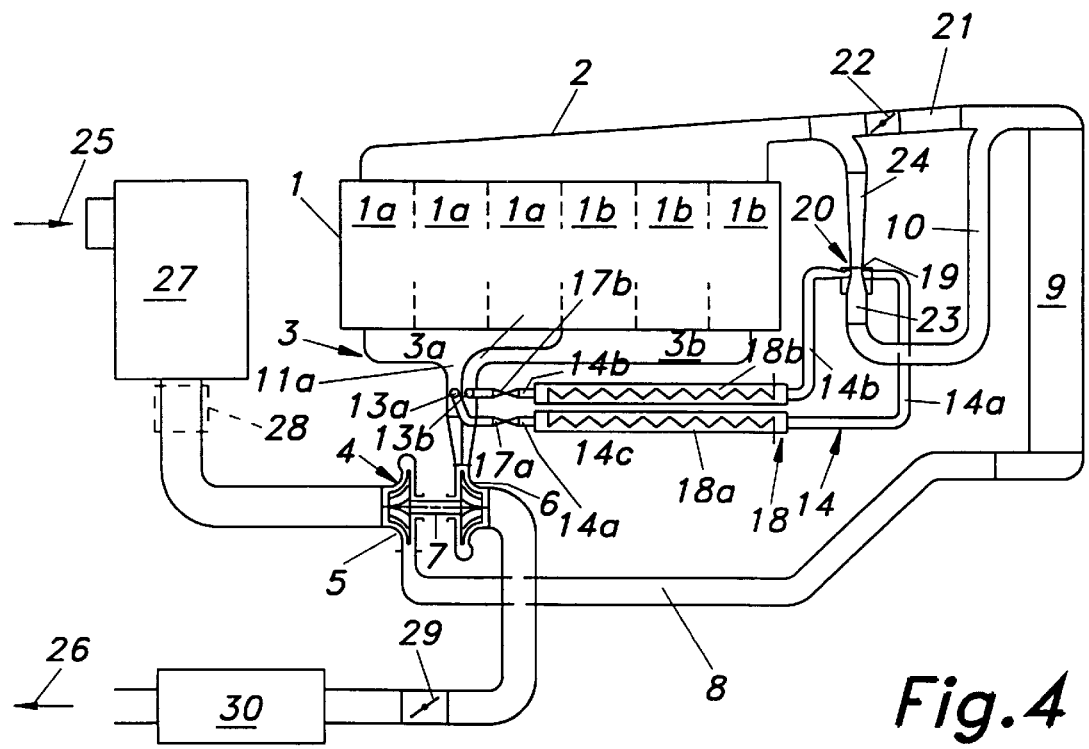

A similar effect may be achieved by providing an exhaust cooler 18a, 18b and an exhaust gas recirculation control valve 17a, 17b for each recirculation branch 14a, 14b, as is shown in FIGS. 2 to 4. If desired, the two coolers 18a, 18b could be combined into a single cooling unit, the important feature being that the flow through the exhaust gas cooling device 18 should take place along parallel, separate flow paths. Downstream of the exhaust gas coolers 18a, 18b the two exhaust gas recirculation branches 14a, 14b combine to form the collective recirculation pipe 14c in the variants shown in FIGS. 2 and 3.

As regards the additional volumes, which should be as small as possible, it will be an advantage to place the exhaust gas recirculation control valves 17a, 17b before the exhaust gas cooling device 18 (FIGS. 1, 2, 4). Since the exhaust gas recirculation control valves 17a, 17b will be subject to comparatively high thermal loads in that case, they should be given a sufficiently robust design.

FIG. 3 shows a variant in which the exhaust gas recirculation control valves 17a, 17b are positioned behind the exhaust gas cooling device 18, in which instance they may have a simpler design.

Instead of uniting branches 14a, 14b into a collective exhaust gas recirculation pipe 14c, the exhaust gas recirculation branches 14a, 14b may be designed to open directly into the nozzle-diffuser unit 20, as is shown in FIG. 4.

In FIGS. 1 to 4 the flow directions of air and exhaust gas are indicated by arrows 25 and 26. For control of the exhaust gas recirculation a flow sensor 28 may be provided downstream of the air filter 27, measuring the flow of the air volume. Conventional use of an exhaust back-pressure valve 29 would also be possible, as is shown in FIGS. 1 to 4, i.e., between the turbine 6 and a particle filter 30.

We claim:

1. An internal combustion engine with an exhaust gas turbocharger comprising:

a charge-air pipe and an exhaust gas recirculation pipe for a partial stream of the exhaust gas, a nozzle-diffuser unit being provided in the charge-air pipe, said recirculation pipe opening into the nozzle-diffuser unit in a passage of restricted cross-section, and an exhaust gas cooling device and an exhaust control device being provided in the exhaust gas recirculation pipe, wherein the exhaust gas turbocharger is configured at least as a twin-entry unit, and at least two exhaust gas flow paths are separately conducted to an entrance into the exhaust gas turbocharger, and wherein an exhaust gas recirculation branch of the exhaust gas recirculation pipe departs from each exhaust gas flow path.

2. Internal combustion engine as claimed in claim 1, wherein said exhaust gas control device includes an exhaust gas recirculation control valve being positioned in each exhaust gas recirculation branch.

3. Internal combustion engine as claimed in claim 1, wherein the exhaust gas recirculation branches are united in a collective recirculation pipe.

4. Internal combustion engine as claimed in claim 2, wherein the exhaust gas recirculation branches are united in a collective recirculation pipe downstream of the exhaust gas recirculation control valves.

5. Internal combustion engine as claimed in claim 3, wherein the exhaust gas cooling device is positioned in the collective recirculation pipe.

6. Internal combustion engine as claimed in claim 1, wherein the exhaust gas recirculation branches are conducted separately to the entrance into the nozzle-diffuser unit.

7. Internal combustion engine as claimed in claim 1, wherein as exhaust gas cooling device an exhaust gas cooler is provided in each exhaust gas recirculation branch.

8. Internal combustion engine as claimed in claim 1, wherein the nozzle-diffuser unit is configured as a venturi nozzle.

9. Internal combustion engine as claimed in claim 1, wherein a bypass line is provided running in parallel with the nozzle-diffuser unit, which includes a control valve.

10. Internal combustion engine as claimed in claim 9, wherein said control valve is configured as a throttle valve.

11. Internal combustion engine as claimed in claim 2, wherein the exhaust gas recirculation control valves are positioned downstream of the exhaust gas cooling device.

12. Internal combustion engine as claimed in claim 2, wherein the exhaust gas recirculation control valves are positioned upstream of the exhaust gas cooling device.

13. Internal combustion engine as claimed in claim 7, wherein the exhaust gas coolers form parts of an exhaust gas cooling device configured at least as a twin-entry unit.

* * * * *